US010103783B2

(12) United States Patent
Zhao et al.

(10) Patent No.: US 10,103,783 B2
(45) Date of Patent: Oct. 16, 2018

(54) RADIO FREQUENCY DISCOVERY METHOD, CHIP, AND DEVICE

(71) Applicant: HUAWEI TECHNOLOGIES CO., LTD., Shenzhen (CN)

(72) Inventors: Xiaona Zhao, Beijing (CN); Jingqing Mei, Beijing (CN); Xinmiao Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/580,269

(22) PCT Filed: Jun. 30, 2015

(86) PCT No.: PCT/CN2015/082879
§ 371 (c)(1),
(2) Date: Dec. 6, 2017

(87) PCT Pub. No.: WO2017/000244
PCT Pub. Date: Jan. 5, 2017

(65) Prior Publication Data
US 2018/0175910 A1 Jun. 21, 2018

(51) Int. Cl.
H04B 5/00 (2006.01)
H04W 8/00 (2009.01)
(Continued)

(52) U.S. Cl.
CPC ............ H04B 5/0031 (2013.01); H04W 4/80 (2018.02); H04W 8/005 (2013.01); H04W 88/023 (2013.01); H04B 5/0037 (2013.01)

(58) Field of Classification Search
None
See application file for complete search history.

(56) References Cited

U.S. PATENT DOCUMENTS 8,713,585 B2 * 4/2014 Teruyama ............... H04W 4/00
719/320
8,971,800 B2 * 3/2015 Hillan .................. H04B 5/0031
455/41.1
(Continued)

FOREIGN PATENT DOCUMENTS

CN 103034823 A 4/2013
CN 103582891 A 2/2014
(Continued)

Primary Examiner — Tuan A Tran
(74) Attorney, Agent, or Firm — Kilpatrick Townsend & Stockton LLP

(57) ABSTRACT

Embodiments described in the present disclosure disclose a radio frequency discovery method that relates to a first device and a second device. At least two applications are installed on the first device. After a user selects a first application from the at least two applications, a near field communication controller in the first device obtains an RF technology supported by the first application; determines at least one to-be-used RF technology in information indicating the RF technology supported by the first application; then receives a detection command sent by the second device for a first RF technology; and when the to-be-used RF technology includes the first RF technology, sends a response message for the detection command to the second device; or when the to-be-used RF technology does not include the first RF technology, determines not to send a response message for the detection command.

15 Claims, 6 Drawing Sheets

(51) Int. Cl.
*H04W 88/02* (2009.01)
*H04W 4/80* (2018.01)

(56) References Cited

U.S. PATENT DOCUMENTS

| | | | | |
|---|---|---|---|---|
| 8,997,119 | B2* | 3/2015 | Teruyama | H04W 4/00 |
| | | | | 719/320 |
| 9,094,049 | B2* | 7/2015 | Hillan | H04B 5/00 |
| 9,351,322 | B2* | 5/2016 | Suumaki | H04M 1/7253 |
| 9,356,657 | B2* | 5/2016 | Teruyama | H04W 4/00 |
| 9,400,898 | B2* | 7/2016 | Hagedorn | G06K 7/0008 |
| 9,413,754 | B2* | 8/2016 | Stuntebeck | H04L 63/0846 |
| 9,735,834 | B2* | 8/2017 | Hillan | H04B 5/0031 |
| 9,800,693 | B2* | 10/2017 | Hillan | H04L 69/08 |
| 9,838,941 | B2* | 12/2017 | Van Nieuwenhuyze | |
| | | | | H04W 40/02 |
| 9,876,534 | B2* | 1/2018 | Teruyama | H04W 4/00 |
| 9,887,743 | B2* | 2/2018 | Hillan | H04B 5/02 |
| 9,900,052 | B2* | 2/2018 | Teruyama | H04W 4/80 |
| 9,960,812 | B2* | 5/2018 | Kumar | H04B 5/0031 |
| 9,967,798 | B2* | 5/2018 | Van Nieuwenhuyze | |
| | | | | H04B 5/0031 |
| 2012/0045989 | A1 | 2/2012 | Suumaeki et al. | |
| 2012/0309303 | A1 | 12/2012 | Hillan et al. | |
| 2013/0078920 | A1 | 3/2013 | Hillan | |
| 2013/0084798 | A1 | 4/2013 | Faithorn | |
| 2013/0203351 | A1 | 8/2013 | Hillan et al. | |
| 2013/0267169 | A1 | 10/2013 | Hillan et al. | |
| 2013/0324036 | A1 | 12/2013 | Hillan et al. | |

FOREIGN PATENT DOCUMENTS

| | | |
|---|---|---|
| CN | 103828408 A | 5/2014 |
| CN | 104106077 A | 10/2014 |
| CN | 104205995 A | 12/2014 |
| CN | 104335617 A | 2/2015 |
| EP | 2706793 A2 | 3/2014 |
| EP | 2782400 A1 | 9/2014 |
| WO | 2012166977 A2 | 12/2012 |

* cited by examiner

|        | T1T | T2T | T3T | ISO-DEP (T4AT/T4BT) | T5T | NFC-DEP |
|--------|-----|-----|-----|---------------------|-----|---------|
| NFC-A  | ✓   | ✓   |     | ✓                   |     | ✓       |
| NFC-B  |     |     |     | ✓                   |     |         |
| NFC-F  |     |     | ✓   |                     |     | ✓       |
| NFC-V  |     |     |     |                     | ✓   |         |

RADIO FREQUENCY DISCOVERY METHOD, CHIP, AND DEVICE

CROSS-REFERENCE TO RELATED APPLICATIONS

This application is a national stage of International Application No. PCT/CN2015/082879, filed on Jun. 30, 2015, which is hereby incorporated by reference in its entirety.

TECHNICAL FIELD

The present disclosure relates to the field of mobile communications technologies, and in particular, to a radio frequency discovery method, a chip, and a device.

BACKGROUND

Near field communication (NFC) is a short-range wireless connection technology that is based on radio frequency identification (RFID), to implement close-range communication between electronic devices by using magnetic field induction. An effective communication range of the NFC is 0 cm to 20 cm. The NFC may be applied to near field payment. Provided that a user gets a device in contact with another device or gets a device close to another device, information exchange and transaction payment can be safely and quickly performed.

Operating modes of an NFC device may be mainly classified into the following three modes:

1. a peer-to-peer (P2P) mode, used in a scenario such as contact card sharing, web page sharing, or NFC pairing;

2. a card emulation (CE) mode, used in a mobile payment scenario or an identity authentication scenario such as bank card emulation, transportation card emulation, membership card emulation, coupon emulation, or identification card emulation; and 3. a reader/writer (R/W) mode, used in a mobile payment scenario or an identity authentication scenario, and a label reader/writer scenario, such as bank card POS machine emulation or bus POS machine emulation.

As shown in FIG. 1, an NFC device mainly includes the following three functional entities: a main controller (Device Host, DH), an NFC controller (NFCC), and an NFC execution environment (NFCEE). The DH is responsible for management of the entire NFC device, including management of the NFCC, for example, initialization, parameter configuration, or power supply management. The NFCC is an entity of an NFC chip responsible for data transmission. Usually, the NFCC is directly used to indicate the NFC chip. The NFCEE provides a secure execution environment for an NFC application (App). A mobile phone is used as an example. The DH may be corresponding to a central processing unit (CPU) of the mobile phone. The NFCC may be corresponding to an NFC chip. The NFCEE may be corresponding to multiple physical forms such as a universal integrated circuit card UICC), an embedded secure element (eSE), and a secure digital memory card (SD card), or may be corresponding to a soft environment such as host card emulation (HCE). FIG. 1 further includes a DH-NFCEE. The DH-NFCEE is an NFCEE that is connected to only the DH or that is integrated into the DH. A logical interface for communication between the DH and the NFCC is defined in the NFC controller interface (NCI) specification formulated by the NFC Forum. In addition, the NFCC may communicate with the NFCEE or the DH may communicate with the NFCEE by using the Host Controller Interface (HCI) Communications Protocol.

According to the NCI specification, an NFC device discovers another NFC device by using a radio frequency (RF) discovery process. Usually, in the RF discovery process, an NFC device on one end is in a poll mode (English name: Poll Mode), and a peer NFC device is in a listen mode (English name: Listen Mode). Usually, the NFC device sends a command and receives a response, in a poll mode; and receives a command and sends a response, in a listen mode.

Four types of RF technologies NFC-A, NFC-B, NFC-F, and NFC-V are defined in a current NCI specification. In all the four types of RF technologies, a 13.56 MHz RF carrier is used, and a same RF protocol may be supported, but different modulation schemes, bit codes, and frame formats are used. The RF protocol is a protocol used when NFC devices communicate with each other. One RF technology may support multiple RF protocols, and one RF protocol may be corresponding to multiple RF technologies. Multiple applications may be installed on an NFCEE of the NFC device. Each application supports one or more RF technologies, but one application generally supports only one RF protocol. A correspondence between the RF technology and the RF protocol is shown in FIG. 2. NFC-A is used as an example. It can be learned from FIG. 2 that an NFC-A technology may support four RF protocols T1T, T2T, ISO-DEP (T4AT/T4BT), and NFC-DEP.

In a radio frequency discovery process, an NFC device in a poll mode (hereinafter referred to as a poll device) successively sends detection commands for the four RF technologies, to detect RF technologies supported by a peer device; then further detects, according to the RF technologies supported by the peer device, specific RF protocols supported by the peer device; and finally, selects one protocol from the detected RF protocols supported by the peer device, to perform communication between the poll device and the peer device.

However, according to an existing radio frequency discovery process, an application corresponding to an RF protocol selected by a poll device usually does not meet user's intention. When the application corresponding to the RF protocol selected by the poll device does not meet the user's intention, the poll device may initiate the radio frequency discovery process again to reselect an RF protocol. Consequently, radio frequency discovery efficiency is low, and resources are wasted.

SUMMARY

To resolve the foregoing technical problem, embodiments described in the present disclosure provide a radio frequency discovery method, a chip, and a device, so as to improve existing radio frequency discovery efficiency and save resources.

According to a first aspect, an embodiment of the present disclosure provides a radio frequency RF discovery method, the method is applied to a near field communication controller NFCC in a first device, at least two applications are installed on the first device, and the method includes: obtaining, by the NFCC, information indicating an RF technology supported by a first application, where the first application is an application selected by a user from the at least two applications; determining, by the NFCC, at least one to-be-used RF technology in information indicating the RF technology supported by the first application; receiving, by the NFCC, a detection command sent by a second device for a first RF technology; and when the to-be-used RF technology includes the first RF technology, sending, by the NFCC, a response message for the detection command to the second device; or when the to-be-used RF technology does not include the first RF technology, determining, by the NFCC, not to send a response message for the detection command.

With reference to the first aspect, in a first implementation of the first aspect, the obtaining, by the NFCC, information indicating an RF technology supported by a first application includes: receiving, by the NFCC, a first instruction message sent by a main controller DH, where the first instruction message carries information indicating the RF technology supported by the first application, and the first instruction message is used to instruct the NFCC to determine the at least one to-be-used RF technology in information indicating the RF technology supported by the first application; and obtaining, by the NFCC by using the first instruction message, information indicating the RF technology supported by the first application.

With reference to the first implementation of the first aspect, in a second implementation of the first aspect, before the receiving, by the NFCC, a first instruction message sent by a DH, the method further includes: sending, by the NFCC, a first request message to the DH, where the first request message carries an identifier of the first application, and the first request message is used to request the DH to query, according to the identifier of the first application, information indicating the RF technology supported by the first application.

With reference to the first aspect, in a third implementation of the first aspect, the obtaining, by the NFCC, information indicating an RF technology supported by a first application includes: obtaining, by the NFCC from a near field communication execution environment NFCEE in which the first application is located, information indicating the RF technology supported by the first application.

With reference to the third implementation of the first aspect, in a fourth implementation of the first aspect, after the obtaining, by the NFCC, information indicating an RF technology supported by a first application, the method further includes: sending, by the NFCC, a second request message to the DH, where the second request message carries at least one of the following: an identifier of the NFCEE in which the first application is located, an identifier of the first application, or information indicating the RF technology supported by the first application; and receiving, by the NFCC, a second instruction message sent by the DH, where the second instruction message is used to instruct the NFCC to determine the at least one to-be-used RF technology in information indicating the RF technology supported by the first application.

With reference to the first aspect, in a fifth implementation of the first aspect, before the determining, by the NFCC, at least one to-be-used RF technology in information indicating the RF technology supported by the first application, the method further includes: determining, by the NFCC, whether instruction information allows the NFCC to determine the at least one to-be-used RF technology in information indicating the RF technology supported by the first application, where the instruction information is a parameter preconfigured in the NFCC, and the instruction information indicates whether the NFCC is allowed to determine the at least one to-be-used RF technology in information indicating the RF technology supported by the first application.

With reference to all the foregoing implementations of the first aspect, in a sixth implementation of the first aspect, after the method, the method further includes: setting, by the NFCC, all or some of the to-be-used RF technology to a to-be-used RF technology within a preset time.

According to a second aspect, an embodiment of the present disclosure provides a radio frequency RF discovery method, the method is applied to a near field communication controller NFCC in a first device, at least two applications are installed on the first device, and the method includes: obtaining, by the NFCC, information indicating an RF technology supported or not supported by a first application, where the first application is an application selected by a user from the at least two applications; determining, by the NFCC, at least one to-be-disabled RF technology according to information indicating the RF technology supported by the first application, or determining, by the NFCC, at least one to-be-disabled RF technology in the RF technology not supported by the first application; receiving, by the NFCC, a detection command sent by a second device for a first RF technology; and when the to-be-disabled RF technology includes the first RF technology, determining, by the NFCC, not to send a response message for the detection command; or when the to-be-disabled RF technology does not include the first RF technology, sending, by the NFCC, a response message for the detection command to the second device.

With reference to the second aspect, in a first implementation of the second aspect, the obtaining, by the NFCC, information indicating an RF technology supported or not supported by a first application includes: receiving, by the NFCC, a first instruction message sent by a main controller DH, where the first instruction message carries information indicating the RF technology supported or not supported by the first application, and the first instruction message is used to instruct the NFCC to determine the at least one to-be-disabled RF technology according to information indicating the RF technology supported by the first application, or the first instruction message is used to instruct the NFCC to determine the at least one to-be-disabled RF technology in the RF technology not supported by the first application; and obtaining, by the NFCC by using the first instruction message, information indicating the RF technology supported or not supported by the first application.

With reference to the first implementation of the second aspect, in a second implementation of the second aspect, before the receiving, by the NFCC, a first instruction message sent by a DH, the method further includes: sending, by the NFCC, a first request message to the DH, where the first request message carries an identifier of the first application, and the first request message is used to request the DH to query, according to the identifier of the first application, information indicating the RF technology supported or not supported by the first application.

With reference to the second aspect, in a third implementation of the second aspect, the obtaining, by the NFCC, information indicating an RF technology supported or not supported by a first application includes: obtaining, by the NFCC from a near field communication execution environment NFCEE in which the first application is located, information indicating the RF technology supported or not supported by the first application.

With reference to the third implementation of the second aspect, in a fourth implementation of the second aspect, after the obtaining, by the NFCC, information indicating an RF technology supported or not supported by a first application, the method further includes: sending, by the NFCC, a second request message to the DH, where the second request message carries at least one of the following: an identifier of the NFCEE in which the first application is located, an identifier of the first application, or information indicating the RF technology supported or not supported by the first application; and receiving, by the NFCC, a second instruction message sent by the DH, where the second instruction message is used to instruct the NFCC to determine the at least one to-be-disabled RF technology according to information indicating the RF technology supported by the first application, or the second instruction message is used to instruct the NFCC to determine the at least one to-be-disabled RF technology in the RF technology not supported by the first application.

With reference to the second aspect, in a fifth implementation of the second aspect, before the determining, by the NFCC, at least one to-be-disabled RF technology according to information indicating the RF technology supported by the first application, or determining, by the NFCC, at least one to-be-disabled RF technology in the RF technology not supported by the first application, the method further includes: determining, by the NFCC, whether instruction information allows the NFCC to determine the at least one to-be-disabled RF technology according to information indicating the RF technology supported by the first application, or determining, by the NFCC, whether instruction information allows the NFCC to determine the at least one to-be-disabled RF technology in the RF technology not supported by the first application, where the instruction information is a parameter preconfigured in the NFCC, and the instruction information indicates whether the NFCC is allowed to determine the at least one to-be-disabled RF technology according to information indicating the RF technology supported by the first application, or the instruction information indicates whether the NFCC is allowed to determine the at least one to-be-disabled RF technology in the RF technology not supported by the first application.

With reference to all the foregoing implementations of the second aspect, in a sixth implementation of the second aspect, after the method, the method further includes: setting, by the NFCC, all or some of the to-be-disabled RF technology to a to-be-disabled RF technology within a preset time.

According to a third aspect, an embodiment of the present disclosure provides an NFC chip, the NFC chip is disposed in a first device, at least two applications are installed on the first device, and the NFC chip includes: an obtaining unit, configured to obtain an RF technology supported by a first application, where the first application is an application selected by a user from the at least two applications; a determining unit, configured to determine at least one to-be-used RF technology in information indicating the RF technology supported by the first application; a receiving unit, configured to receive a detection command sent by a second device for a first RF technology; a processing unit, configured to: when the to-be-used RF technology includes the first RF technology, instruct a sending unit to send a response message for the detection command to the second device; or when the to-be-used RF technology does not include the first RF technology, determine not to send a response message for the detection command; and the sending unit, configured to send the response message for the detection command to the second device.

With reference to the third aspect, in a first implementation of the third aspect, the receiving unit is further configured to receive a first instruction message sent by a main controller DH, where the first instruction message carries information indicating the RF technology supported by the first application, and the first instruction message is used to instruct the NFC chip to determine the at least one to-be- used RF technology in information indicating the RF technology supported by the first application; and that the obtaining unit is configured to obtain information indicating the RF technology supported by the first application includes: the obtaining unit is configured to obtain, by using the first instruction message, information indicating the RF technology supported by the first application.

With reference to the first implementation of the third aspect, in a second implementation of the third aspect, before the receiving unit receives the first instruction message sent by the DH, the sending unit is further configured to send a first request message to the DH, where the first request message carries an identifier of the first application, and the first request message is used to request the DH to query, according to the identifier of the first application, information indicating the RF technology supported by the first application.

With reference to the third aspect, in a third implementation of the third aspect, that the obtaining unit is configured to obtain information indicating the RF technology supported by the first application includes: the obtaining unit is configured to obtain, from a near field communication execution environment NFCEE in which the first application is located, information indicating the RF technology supported by the first application.

With reference to the third implementation of the third aspect, in a fourth implementation of the third aspect, after the obtaining unit obtains information indicating the RF technology supported by the first application, the sending unit is further configured to send a second request message to the DH, where the second request message carries at least one of the following: an identifier of the NFCEE in which the first application is located, an identifier of the first application, or information indicating the RF technology supported by the first application; and the receiving unit is further configured to receive a second instruction message sent by the DH, where the second instruction message is used to instruct the NFC chip to determine the at least one to-be-used RF technology in information indicating the RF technology supported by the first application.

With reference to the third aspect, in a fifth implementation of the third aspect, before the determining unit determines the at least one to-be-used RF technology in information indicating the RF technology supported by the first application, the determining unit is further configured to determine whether instruction information allows the NFC chip to determine the at least one to-be-used RF technology in information indicating the RF technology supported by the first application, where the instruction information is a parameter preconfigured in the NFC chip, and the instruction information indicates whether the NFC chip is allowed to determine the at least one to-be-used RF technology in information indicating the RF technology supported by the first application.

With reference to all the foregoing implementations of the third aspect, in a sixth implementation of the third aspect, the NFC chip further includes: a setting unit, configured to set all or some of the to-be-used RF technology to a to-be-used RF technology within a preset time.

According to a fourth aspect, an embodiment of the present disclosure provides an NFC chip, the NFC chip is disposed in a first device, at least two applications are installed on the first device, and the NFC chip includes: an obtaining unit, configured to obtain an RF technology supported or not supported by a first application, where the first application is an application selected by a user from the at least two applications; a determining unit, configured to:

determine at least one to-be-disabled RF technology according to information indicating the RF technology supported by the first application, or determine at least one to-be-disabled RF technology in the RF technology not supported by the first application; a receiving unit, configured to receive a detection command sent by a second device for a first RF technology; a processing unit, configured to: when the to-be-disabled RF technology includes the first RF technology, determine not to send a response message for the detection command; or when the to-be-disabled RF technology does not include the first RF technology, instruct a sending unit to send a response message for the detection command to the second device; and the sending unit, configured to send the response message for the detection command to the second device.

With reference to the fourth aspect, in a first implementation of the fourth aspect, the receiving unit is further configured to receive a first instruction message sent by a main controller DH, where the first instruction message carries information indicating the RF technology supported or not supported by the first application, and the first instruction message is used to instruct the NFC chip to determine the at least one to-be-disabled RF technology according to information indicating the RF technology supported by the first application, or the first instruction message is used to instruct the NFC chip to determine the at least one to-be-disabled RF technology in the RF technology not supported by the first application; and that the obtaining unit is configured to obtain information indicating the RF technology supported or not supported by the first application includes: the obtaining unit is configured to obtain, by using the first instruction message, information indicating the RF technology supported or not supported by the first application.

With reference to the first implementation of the fourth aspect, in a second implementation of the fourth aspect, before the receiving unit receives the first instruction message sent by the DH, the sending unit is further configured to send a first request message to the DH, where the first request message carries an identifier of the first application, and the first request message is used to request the DH to query, according to the identifier of the first application, information indicating the RF technology supported or not supported by the first application.

With reference to the fourth aspect, in a third implementation of the fourth aspect, that the obtaining unit is configured to obtain information indicating the RF technology supported or not supported by the first application includes: the obtaining unit is configured to obtain, from a near field communication execution environment NFCEE in which the first application is located, information indicating the RF technology supported or not supported by the first application.

With reference to the third implementation of the fourth aspect, in a fourth implementation of the fourth aspect, after the obtaining unit is configured to obtain information indicating the RF technology supported or not supported by the first application, the sending unit is further configured to send a second request message to the DH, where the second request message carries at least one of the following: an identifier of the NFCEE in which the first application is located, an identifier of the first application, or information indicating the RF technology supported or not supported by the first application; and the receiving unit is further configured to receive a second instruction message sent by the DH, where the second instruction message is used to instruct the NFC chip to determine the at least one to-be-disabled RF technology according to information indicating the RF technology supported by the first application, or the second instruction message is used to instruct the NFC chip to determine the at least one to-be-disabled RF technology in the RF technology not supported by the first application.

With reference to the fourth aspect, in a fifth implementation of the fourth aspect, before the determining unit determines the at least one to-be-disabled RF technology according to information indicating the RF technology supported by the first application, or the NFC chip determines the at least one to-be-disabled RF technology in the RF technology not supported by the first application, the determining unit is further configured to determine whether instruction information allows the NFC chip to determine the at least one to-be-disabled RF technology according to information indicating the RF technology supported by the first application, or the determining unit is further configured to determine whether instruction information allows the NFC chip to determine the at least one to-be-disabled RF technology in the RF technology not supported by the first application, where the instruction information is a parameter preconfigured in the NFC chip, and the instruction information indicates whether the NFC chip is allowed to determine the at least one to-be-disabled RF technology according to information indicating the RF technology supported by the first application, or the instruction information indicates whether the NFC chip is allowed to determine the at least one to-be-disabled RF technology in the RF technology not supported by the first application.

With reference to all the foregoing implementations of the fourth aspect, in a sixth implementation of the fourth aspect, the NFC chip further includes: a setting unit, configured to set all or some of the to-be-disabled RF technology to a to-be-disabled RF technology within a preset time.

According to a fifth aspect, an embodiment of the present disclosure provides an NFC chip, the NFC chip is disposed in a first device, at least two applications are installed on the first device, and the NFC chip includes: a processor, configured to: obtain an RF technology supported by a first application, where the first application is an application selected by a user from the at least two applications; determine at least one to-be-used RF technology in information indicating the RF technology supported by the first application; instruct a receiver to receive a detection command sent by a second device for a first RF technology; and when the to-be-used RF technology includes the first RF technology, instruct a transmitter to send a response message for the detection command to the second device; or when the to-be-used RF technology does not include the first RF technology, determine not to send a response message for the detection command; the receiver, configured to receive the detection command sent by the second device for the first RF technology; the transmitter, configured to send the response message for the detection command to the second device; a memory, configured to store program code; and a communications bus, configured to connect the receiver, the transmitter, the processor, and the memory.

With reference to the fifth aspect, in a first implementation of the fifth aspect, the receiver is further configured to receive a first instruction message sent by a main controller DH, where the first instruction message carries information indicating the RF technology supported by the first application, and the first instruction message is used to instruct the NFC chip to determine the at least one to-be-used RF technology in information indicating the RF technology supported by the first application; and that the processor is configured to obtain information indicating the RF technology supported by the first application includes: the processor is configured to obtain, by using the first instruction message, information indicating the RF technology supported by the first application.

With reference to the first implementation of the fifth aspect, in a second implementation of the fifth aspect, before the receiver receives the first instruction message sent by the DH, the transmitter is further configured to send a first request message to the DH, where the first request message carries an identifier of the first application, and the first request message is used to request the DH to query, according to the identifier of the first application, information indicating the RF technology supported by the first application.

With reference to the fifth aspect, in a third implementation of the fifth aspect, the memory is further configured to store the first application, and that the processor is configured to obtain information indicating the RF technology supported by the first application includes: the processor is configured to obtain, from the memory, information indicating the RF technology supported by the first application.

With reference to the third implementation of the fifth aspect, in a fourth implementation of the fifth aspect, after the processor obtains information indicating the RF technology supported by the first application, the transmitter is further configured to send a second request message to the DH, where the second request message carries at least one of the following: an identifier of the memory, an identifier of the first application, or information indicating the RF technology supported by the first application; and the receiver is further configured to receive a second instruction message sent by the DH, where the second instruction message is used to instruct the NFC chip to determine the at least one to-be-used RF technology in information indicating the RF technology supported by the first application.

With reference to the fifth aspect, in a fifth implementation of the fifth aspect, before the processor determines the at least one to-be-used RF technology in information indicating the RF technology supported by the first application, the processor is further configured to determine whether instruction information allows the NFC chip to determine the at least one to-be-used RF technology in information indicating the RF technology supported by the first application, where the instruction information is a parameter preconfigured in the NFC chip, and the instruction information indicates whether the NFC chip is allowed to determine the at least one to-be-used RF technology in information indicating the RF technology supported by the first application.

With reference to all the foregoing implementations of the fifth aspect, in a sixth implementation of the fifth aspect, the processor is further configured to set all or some of the to-be-used RF technology to a to-be-used RF technology within a preset time.

According to a sixth aspect, an embodiment of the present disclosure provides an NFC chip, the NFC chip is disposed in a first device, at least two applications are installed on the first device, and the NFC chip includes: a processor, configured to: obtain an RF technology supported or not supported by a first application, where the first application is an application selected by a user from the at least two applications; determine at least one to-be-disabled RF technology according to information indicating the RF technology supported by the first application, or determine at least one to-be-disabled RF technology in the RF technology not supported by the first application; instruct a receiver to receive a detection command sent by a second device for a first RF technology; and when the to-be-disabled RF technology includes the first RF technology, determine not to send a response message for the detection command; or when the to-be-disabled RF technology does not include the first RF technology, instruct a transmitter to send a response message for the detection command to the second device; the receiver, configured to receive the detection command sent by the second device for the first RF technology; the transmitter, configured to send the response message for the detection command to the second device; a memory, configured to store program code; and a communications bus, configured to connect the receiver, the transmitter, the processor, and the memory.

With reference to the sixth aspect, in a first implementation of the sixth aspect, the receiver is further configured to receive a first instruction message sent by a main controller DH, where the first instruction message carries information indicating the RF technology supported or not supported by the first application, and the first instruction message is used to instruct the NFC chip to determine the at least one to-be-disabled RF technology according to information indicating the RF technology supported by the first application, or the first instruction message is used to instruct the NFC chip to determine the at least one to-be-disabled RF technology in the RF technology not supported by the first application; and that the processor is configured to obtain information indicating the RF technology supported or not supported by the first application includes: the processor is configured to obtain, by using the first instruction message, information indicating the RF technology supported or not supported by the first application.

With reference to the first implementation of the sixth aspect, in a second implementation of the sixth aspect, before the receiver receives the first instruction message sent by the DH, the transmitter is further configured to send a first request message to the DH, where the first request message carries an identifier of the first application, and the first request message is used to request the DH to query, according to the identifier of the first application, information indicating the RF technology supported or not supported by the first application.

With reference to the sixth aspect, in a third implementation of the sixth aspect, the memory is further configured to store the first application, and that the processor is configured to obtain information indicating the RF technology supported or not supported by the first application includes: the processor is configured to obtain, from the memory, information indicating the RF technology supported or not supported by the first application.

With reference to the third implementation of the sixth aspect, in a fourth implementation of the sixth aspect, after the processor is configured to obtain information indicating the RF technology supported or not supported by the first application, the transmitter is further configured to send a second request message to the DH, where the second request message carries at least one of the following: an identifier of the memory, an identifier of the first application, or information indicating the RF technology supported or not supported by the first application; and the receiver is further configured to receive a second instruction message sent by the DH, where the second instruction message is used to instruct the NFC chip to determine the at least one to-be-disabled RF technology according to information indicating the RF technology supported by the first application, or the second instruction message is used to instruct the NFC chip to determine the at least one to-be-disabled RF technology in the RF technology not supported by the first application.

With reference to the sixth aspect, in a fifth implementation of the sixth aspect, before the processor determines the at least one to-be-disabled RF technology according to information indicating the RF technology supported by the first application, or the NFC chip determines the at least one to-be-disabled RF technology in the RF technology not supported by the first application, the processor is further configured to determine whether instruction information allows the NFC chip to determine the at least one to-be-disabled RF technology according to information indicating the RF technology supported by the first application, or the processor is further configured to determine whether instruction information allows the NFC chip to determine the at least one to-be-disabled RF technology in the RF technology not supported by the first application, where the instruction information is a parameter preconfigured in the NFC chip, and the instruction information indicates whether the NFC chip is allowed to determine the at least one to-be-disabled RF technology according to information indicating the RF technology supported by the first application, or the instruction information indicates whether the NFC chip is allowed to determine the at least one to-be-disabled RF technology in the RF technology not supported by the first application.

With reference to all the foregoing implementations of the sixth aspect, in a sixth implementation of the sixth aspect, the processor is further configured to set all or some of the to-be-disabled RF technology to a to-be-disabled RF technology within a preset time.

A beneficial effect brought by the technical solutions provided in the embodiments described in the present disclosure is: After the user selects an application on a device of the user, an NFCC of the device obtains an RF technology supported by the application, determines a to-be-used RF technology according to information indicating the RF technology supported by the application, then responds to only a detection command of a peer device for the to-be-used RF technology, and keeps silent on (that is, does not respond to) a detection command of the peer device for a non-to-be-used RF technology, so as to improve a probability that the application selected by the user on the device of the user is successfully selected by the peer device. Therefore, a radio frequency discovery progress is accelerated, radio frequency discovery efficiency is improved, and resource overheads are reduced.

BRIEF DESCRIPTION OF DRAWINGS

To describe the technical solutions in the embodiments described in the present disclosure more clearly, the following briefly describes the accompanying drawings required for describing the embodiments. Apparently, the accompanying drawings in the following description show merely some embodiments described in the present disclosure, and a person of ordinary skill in the art may still derive other drawings from these accompanying drawings without creative efforts.

FIG. 2 is a diagram of a correspondence between an RF protocol and an RF technology that are defined in the NFC specification;

DESCRIPTION OF EMBODIMENTS

Figure 1:
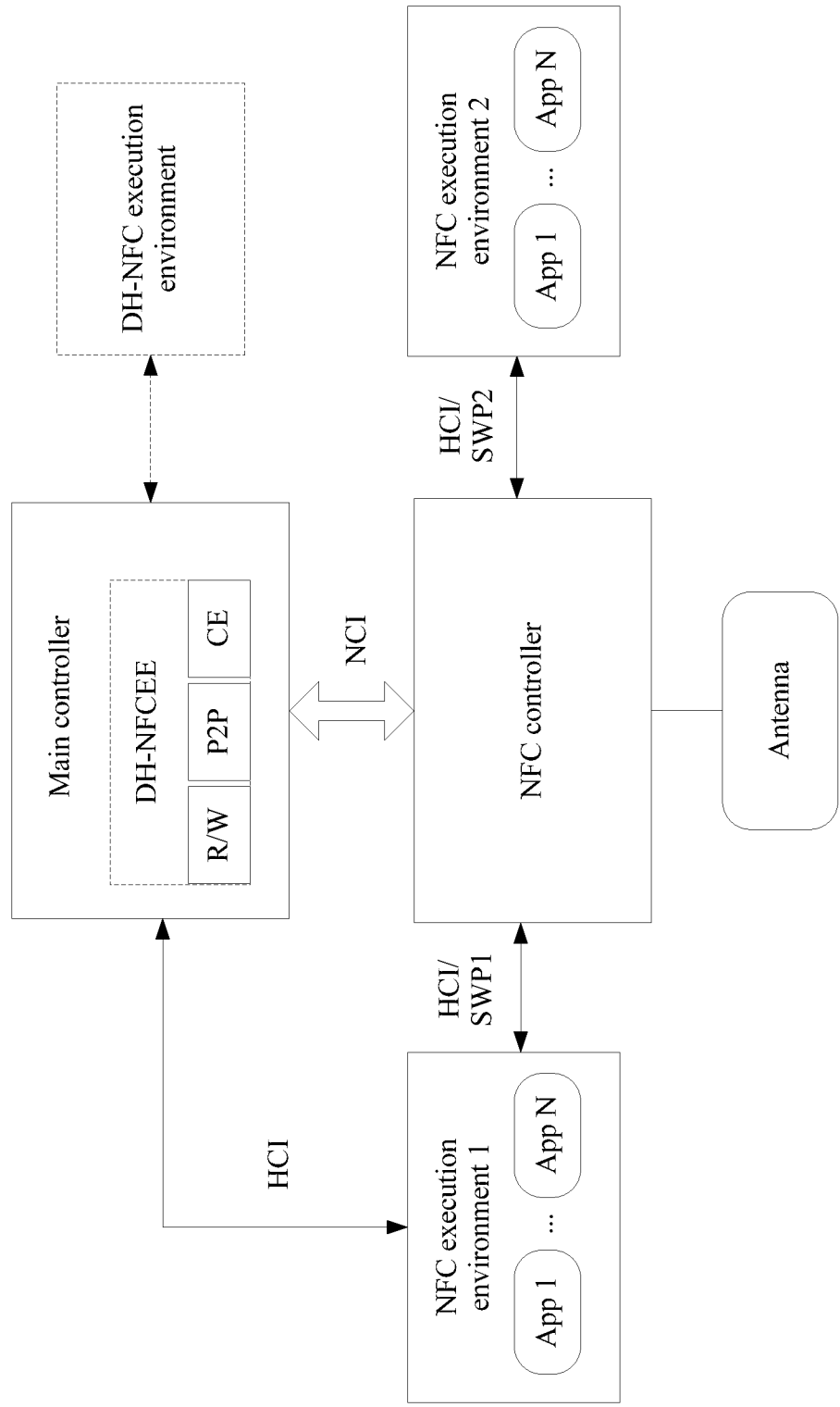
FIG. 1 is a structural diagram of an example of an NFC device.

To make the objectives, technical solutions, and advantages of the present disclosure clearer, the following further describes the embodiments described in the present disclosure in detail with reference to the accompanying drawings.

A device stated in the embodiments described in the present disclosure may also be referred to as a terminal (Terminal), a system, a subscriber unit, a subscriber station, a mobile station, a mobile console, a remote station, a remote terminal, a mobile device, a user terminal, a mobile terminal, a wireless communications device, a user agent, a user apparatus, or user equipment (UE). For example, the device may be a cellular phone, a cordless phone, a Session Initiation Protocol (SIP) phone, a wireless local loop (WLL) station, a personal digital assistant (PDA), a handheld device that has a wireless communications function, a computing device, an in-vehicle communications module, a smart meter, a smart home device, or another processing device that is connected to a wireless modem.

An NFC device stated in the embodiments described in the present disclosure is a device that has an NFC function, that is compatible with a standard formulated by the NFC Forum (NFC Forum), or that passes NFC-related tests and authentication.

A DH, an NFCC, and an NFCEE used in the embodiments described in the present disclosure are all terms used in the NCI specification formulated by the NFC Forum. Alternatively, a DH may be corresponding to a terminal host (English: Terminal Host) in the HCI specification formulated by the European Telecommunications Standards Institute (ETSI). In addition, if a management entity (ME) in a specification formulated by the Global Platform (GP) Organization is implemented on the terminal host, the DH may be referred to as a management host (MH). Alternatively, an NFCC may be corresponding to a contactless front-end (CLF) in the HCI specification. In this case, a host controller (English: Host Controller) in the HCI specification needs to be implemented on the NFCC. Alternatively, an NFCEE may be corresponding to a host such as a UICC, an eSE, or an SD card in the HCI specification, and a secure element (SE) or a card emulation environment (CEE) in a specification formulated by the GP.

Terms "first device" and "second device" that are stated in the embodiments described in the present disclosure are merely used for distinguishing between different devices, and are not in a particular sense or limitation. A symbol "&" represents an "and" relationship, and a symbol "/" represents an "or" relationship.

To facilitate understanding of the embodiments described in the present disclosure, a radio frequency discovery process is first described.

It is assumed that multiple applications are installed on a first NFC device (such as a mobile phone), and the applications support four RF technologies in total: NFC-A, NFC-B, NFC-F, and NFC-V. After the applications are activated, a DH on the first NFC device performs parameter calculation for each of the RF technologies supported by the applications, and then configures, for an NFCC, a configuration parameter obtained after the calculation is performed for each involved RF technology, so that the NFCC uses the configuration parameter in the RF discovery process.

In the embodiments described in the present disclosure, an application that can communicate with another NFC device by using a contactless interface (such as an RF interface defined in the NCI specification) is referred to as an activated application or an activated application, that is, the application after being activated can communicate with the another NFC device by using the contactless interface.

The first NFC device is used as an example. It is assumed that multiple activated applications are installed on the first NFC device, for example, an application 1 (supporting an NFC-A technology), an application 2 (supporting an NFC-A technology and an NFC-B technology), an application 3 (supporting an NFC-F technology), and an application 4 (supporting an NFC-V technology). The DH on the first NFC device obtains a set of configuration parameters by means of calculation for each of the four RF technologies NFC-A, NFC-B, NFC-F, and NFC-V according to related information of the applications, and then separately configures four sets of configuration parameters for the NFCC. For how to specifically perform configuration parameter calculation, refer to the specification formulated by the GP. Details are not described in the present disclosure. Because the configuration parameters need to be used in the RF discovery process defined in the NCI specification, an "RF discovery parameter" is used to indicate the "configuration parameter" in the embodiments described in the present disclosure.

The RF discovery parameter includes an RF discovery parameter in a poll mode and/or an RF discovery parameter in a listen mode. For example, the RF discovery parameter in the poll mode may include parameters such as PA_DEVICES_LIMIT and PN_NFC_DEP_SPEED. The parameter PA_DEVICES_LIMIT indicates an allowed maximum value of a quantity of types of RF protocols that can be detected when a poll device executes a collision resolution for an NFC-A technology. If the quantity of types of detected RF protocols exceeds the allowed maximum value (that is, a value of the parameter), the entire RF discovery procedure is terminated. The parameter PN_NFC_DEP_SPEED is used to indicate a bit rate used by an NFCC of a poll device in subsequent communication after device activation between the poll device and a peer NFC device is completed (that is, protocol activation, which may be understood as a process in which a Media Access Control (MAC) layer between the two devices is activated).

Figure 3:
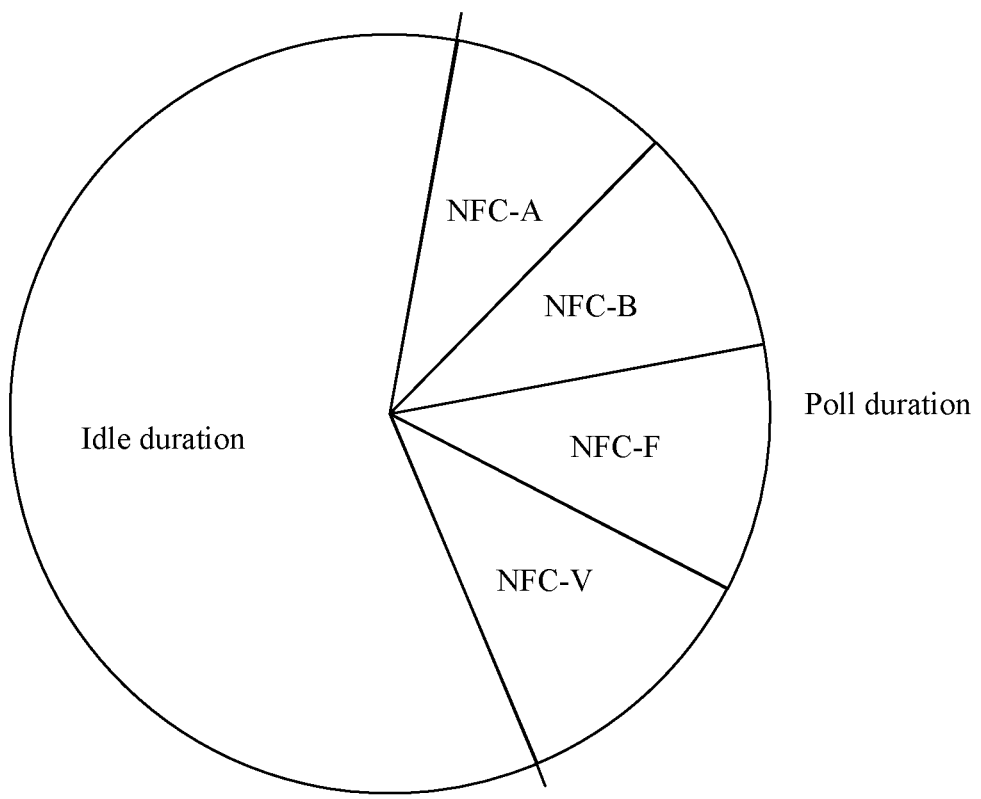
FIG. 3 is a schematic diagram of an RF discovery period.

A peer second NFC device in a poll mode may perform RF technology detection in a specific sequence, that is, successively sending detection commands for the RF technologies. As shown in FIG. 3, an RF discovery period in the poll mode includes poll duration (English: Poll Duration) and idle duration (English: Idle Duration). A sequence in which the second NFC device performs RF technology detection in the poll duration is "NFC-A, NFC-B, NFC-F, and NFC-V". Because each of the four RF technologies is supported by the application on the first NFC device, the NFCC of the first NFC device successively responds in the sequence in which the second NFC device performs technology detection and by using the RF discovery parameters configured by the DH. After detecting that the first NFC device supports the four RF technologies, the second NFC device separately detects specific RF protocols corresponding to the applications on the first NFC device that support the RF technologies, so as to finally determine a quantity of targets (the "target" stated in the embodiments described in the present disclosure is a "protocol type", for example, the second NFC device detects two types of RF protocols, that is, detects two targets). When determining that there is only one target, the second NFC device may directly exchange data with the target. When determining that there are multiple targets, the second NFC device may perform processing according to multiple different preconfigured processing policies, for example, randomly select one of the targets, or terminate the RF discovery procedure.

It can be learned that in the RF discovery process, after the DH on the first NFC device configures the RF discovery parameter for the NFCC, regardless of whether a user selects one of the applications on the first NFC device, and regardless of a specific application selected by the user, the first NFC device responds to the detection command sent by the second NFC device for each RF technology. In addition, an application corresponding to an RF protocol that is finally selected according to the RF discovery process usually does not meet user's intention (for example, although the user selects, from the multiple activated applications installed on the first NFC device, a first application supporting a T3T protocol, according to the RF discovery process, when the second NFC device selects one from multiple detected targets, an application corresponding to the selected target is unnecessarily the first application selected by the user). In this case, the second NFC device usually initiates the radio frequency discovery process again to reselect an RF protocol. Consequently, radio frequency discovery efficiency is low, and resources are wasted.

Figure 4:
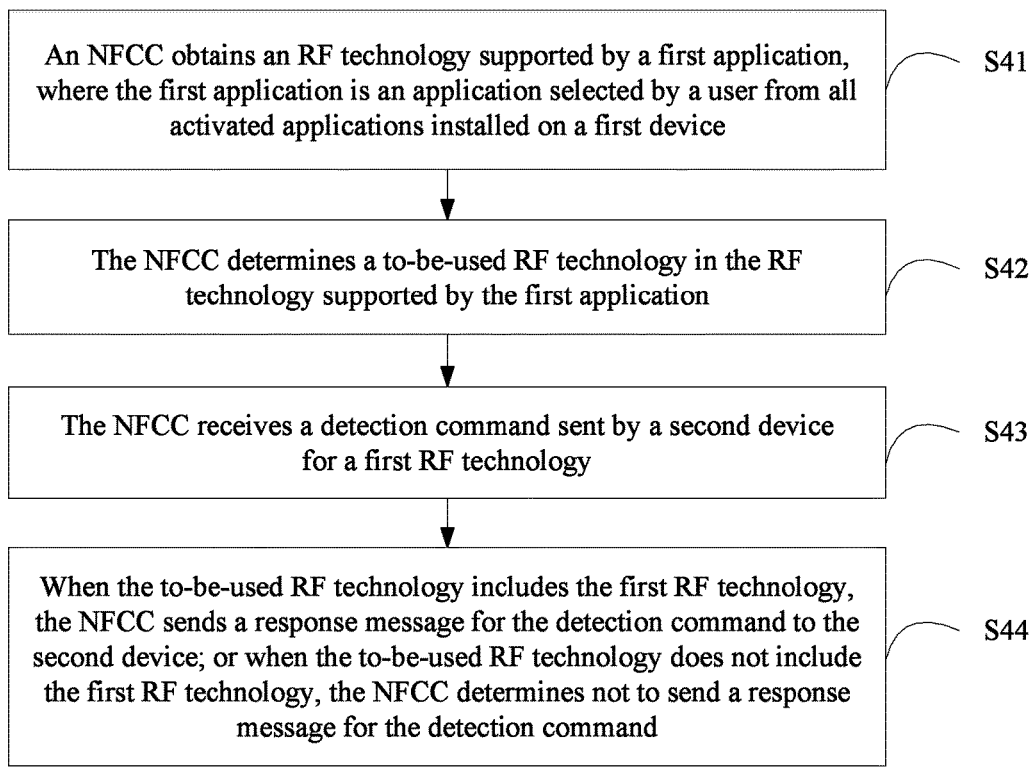
FIG. 4 is a flowchart of an RF discovery method according to an embodiment of the present disclosure.

FIG. 4 is a flowchart of an RF discovery method according to Embodiment 1 in the present disclosure, so as to resolve a problem of resource waste and low discovery efficiency that may exist in an existing RF discovery process. As shown in FIG. 4, the radio frequency discovery method is applied to an NFCC in a first device, and includes the following steps.

S41. The NFCC obtains an RF technology supported by a first application, where the first application is an application selected by a user from all applications installed on the first device.

At least two applications (such as a bank card application, a bus card application, and a membership card application) are installed on the first device (such as a smartphone that has an NFC function). The user selects an application from the at least two applications. It is assumed that the application selected by the user is the first application. Then, the user makes the first device close to a second device (such as a POS machine that has an NFC function) to complete payment.

The NFCC may obtain, in multiple manners, information indicating the RF technology supported by the first application. The manners include but are not limited to the following manners.

Manner 1: After a DH in the first device directly finds, by means of monitoring, that the user selects the first application, or a DH learns, from an NFCEE in which the first application is located, that the user selects the first application, the DH finds, from application information stored in the DH, information indicating the RF technology supported by the first application; or obtains, from the NFCEE in which the first application is located, information indicating the RF technology supported by the first application. Then, the DH sends, to the NFCC, a first instruction message that carries information indicating the RF technology supported by the first application. The first instruction message is used to instruct the NFCC to determine at least one to-be-used RF technology in information indicating the RF technology supported by the first application. Afterwards, the NFCC obtains, by using the first instruction message, information indicating the RF technology supported by the first application. Optionally, after obtaining information indicating the RF technology supported by the first application, the DH compares information indicating the RF technology supported by the first application with an RF technology supported by a second application (the second application is an application selected by the user last time), and then sends a first instruction message to the NFCC. In this case, the first instruction message carries an RF technology different from information indicating the RF technology supported by the second application.

When an underlying connection between the DH, the NFCC, and the NFCEE follows the Single Wire Protocol (SWP) formulated by the ETSI, an upper-layer protocol followed when the DH, the NFCC, and the NFCEE communicate with each other is the HCI Protocol formulated by the ETSI. When another protocol is used in an underlying connection between the DH, the NFCC, and the NFCEE, an upper-layer protocol used when the DH, the NFCC, and the NFCEE communicate with each other is not limited in this embodiment of the present disclosure.

In Manner 1, before receiving the first instruction message sent by the DH, the NFCC may first send, to the DH, a first request message that carries an identifier of the first application. The first request message is used to request the DH to query, according to the identifier of the first application, information indicating the RF technology supported by the first application.

The first instruction message may be a parameter use optimize command (RF_PARAMETER_USE_OPTI-MIZE_CMD). A format of a parameter use optimize command provided in this embodiment of the present disclosure is shown in Table 1.

TABLE 1

Parameter use optimize command

| Payload field | Length | Value/meaning |
|---|---|---|
| Quantity of RF technology types | 1 Octet | A value of the field indicates a quantity of types of RF technologies supported by the first application |
| RF technology type [1 . . . n] | 1 Octet | A value of the field indicates a type of the RF technology supported by the first application. For details, refer to Table 2 |

Table 2 is shown as follows:

TABLE 2

| RF technology type value | Definition |
|---|---|
| 0x00 | NFC_RF_TECHNOLOGY_A |
| 0x01 | NFC_RF_TECHNOLOGY_B |
| 0x02 | NFC_RF_TECHNOLOGY_F |
| 0x03 | NFC_RF_TECHNOLOGY_V |
| 0x04-0x7F | RFU |
| 0x80-0xFE | For proprietary use |
| 0xFF | RFU |

Herein, RFU indicates for future use. In Table 2, 0x00, 0x01, 0x02, and 0x03 are used to respectively indicate NFC-A, NFC-B, NFC-F, and NFC-V.

After receiving the parameter use optimize command, the NFCC may send a parameter use optimize response (RF_PARAMETER_USE_OPTIMIZE_RSP) to the DH. A format of a parameter use optimize response provided in this embodiment of the present disclosure is shown in Table 3.

TABLE 3

Parameter use optimize response

| Payload field | Length | Value/meaning |
|---|---|---|
| Result | 1 Octet | A value of the field indicates whether the NFCC accepts the parameter use optimize command sent by the DH |

Manner 2: After learning, from an NFCEE in which the first application is located, that the user selects the first application, the NFCC obtains, from the NFCEE, information indicating the RF technology supported by the first application. The NFCEE in which the first application is located means that the first application is installed in the NFCEE.

After obtaining information indicating the RF technology supported by the first application, the NFCC needs to send a second request message to a DH to request the DH to allow the NFCC to determine at least one to-be-used RF technology in information indicating the RF technology supported by the first application. The second request message carries at least one of the following: an identifier of the NFCEE in which the first application is located, an identifier of the first application, or information indicating the RF technology supported by the first application. Optionally, after obtaining information indicating the RF technology supported by the first application, the NFCC compares information indicating the RF technology supported by the first application with an RF technology supported by a second application (the second application is an application selected by the user last time), and then sends a second request message to the DH. In this case, the second request message carries an RF technology different from information indicating the RF technology supported by the second application.

The second request message may be an NFCEE radio frequency discovery request notification (RF_NFCEE_DISCOVERY_REQ_NTF) defined in the NCI specification. A format of the notification is shown in Table 4.

TABLE 4

NFCEE radio frequency discovery request notification

| Payload field | Length | Value/meaning | | |
|---|---|---|---|---|
| Quantity of information entries | 1 Octet | A value n of the field indicates a quantity of included information entries | | |
| Information entry [1 . . . n] | x + 2 Octets | Type | 1 Octet | Refer to one of types listed in Table 5 |
| | | Length | 1 Octet | Length of a value (x) |
| | | Value | x Octets | Value of the information entry |

Table 5 is shown as follows:

TABLE 5

| Type | Length | Value/meaning |
|---|---|---|
| . . . | . . . | . . . |
| 0x02 | 2 + M Octets | Used to request the DH to allow the NFCC to determine the at least one to-be-used RF technology in the RF technology supported by the first application, to accelerate an RF discovery process, carrying content shown in Table 6 |
| . . . | . . . | . . . |

Table 5 is obtained after the type 0x02 (the newly added type may also be indicated by using another value) is newly added based on a table defined in the NCI specification in this embodiment of the present disclosure, and other content in the table defined in the NCI specification is omitted.

Information that may be carried in a field corresponding to a value of each information entry in Table 4 is shown in Table 6.

TABLE 6

| Payload field | Length | Value/meaning |
|---|---|---|
| NFCEE identifier | 1 Octet | Used to identify the NFCEE |
| RF technology or RF technology & mode | 1 Octet | Used to indicate the RF technology supported by the first application or the RF technology supported by the first application & a poll mode/listen mode |
| Identifier of the first application | M octet(s) | Used to identify the first application, may be the identifier of the first application, or may be identification information of another form, such as a sequence number of the first application |

Alternatively, the second request message may be an NFCEE action notification (RF_NFCEE_ACTION_NTF) defined in the NCI specification. A format of the notification is shown in Table 7.

TABLE 7

NFCEE action notification

| Payload field | Length | Value/meaning |
|---|---|---|
| NFCEE identifier | 1 Octet | Used to identify the NFCEE |
| Trigger | 1 Octet | Refer to Table 8 |
| Supporting data length | 1 Octet | A value n of the field indicates a length of a supporting data field |
| Supporting data | n Octets | Depends on the trigger |

Table 8 is shown as follows:

TABLE 8

| Trigger | Meaning | Supporting data |
|---|---|---|
| ... | ... | ... |
| 0x05 | Used to request the DH to allow the NFCC to determine the at least one to-be-used RF technology in the RF technology supported by the first application, to accelerate an RF discovery process | ... |
| ... | ... | ... |

Table 8 is obtained after the trigger type 0x05 (the newly added type may also be indicated by using another value) is newly added based on a table defined in the NCI specification in this embodiment of the present disclosure, and other content in the table defined in the NCI specification is omitted. Supporting data corresponding to 0x05 may be empty, or may be the identifier of the first application and/or the RF technology supported by the first application. When the supporting data corresponding to 0x05 is empty, the DH may obtain the identifier of the first application from the NFCEE, and then obtain, according to the identifier of the first application, the RF technology supported by the first application. When the supporting data corresponding to 0x05 includes only the identifier of the first application, the DH may search locally-stored information for or query the RF technology that is supported by the first application and that is from the NFCEE.

In Manner 2, after sending the second request message to the DH, the NFCC needs to first receive a second instruction message sent by the DH, then to determine whether to perform a subsequent step. The second instruction message may be the first instruction message described in Manner 1, or may be a radio frequency discover command (RF_DISCOVER_CMD) defined in the NCI specification.

In Manner 2, after obtaining information indicating the RF technology supported by the first application, the NFCC may not send the second request message; but determine, according to instruction information preconfigured in the NFCC, whether the instruction information allows the NFCC to determine the at least one to-be-used RF technology in the RF technology supported by the first application; and then perform a subsequent step when determining that the instruction information allows the NFCC to determine the at least one to-be-used RF technology in the RF technology supported by the first application.

The instruction information may be a default parameter written into the NFCC in advance when an NFC chip is produced, or may be a parameter preconfigured by the DH in the NFCC (for example, before S41). For example, the instruction information may be implemented by newly adding a parameter PARAMETER_USE_OPTIMIZE_FLAG. When a value of the parameter is 1, it indicates that the NFCC is allowed to determine the at least one to-be-used RF technology in the RF technology supported by the first application. When a value of the parameter is not 1, it indicates that the NFCC is not allowed to determine the at least one to-be-used RF technology in the RF technology supported by the first application.

Alternatively, the instruction information may be implemented by extending a bit (such as b1) in a parameter NFCC_CONFIG_CONTROL defined in the NCI specification. A format of the parameter NFCC_CONFIG_CONTROL is shown in Table 9.

TABLE 9

| Name | Length | Meaning |
|---|---|---|
| NFCC_CONFIG_CONTROL | 1 Octet | Refer to Table 10 |

Table 10 is shown as follows:

TABLE 10

| Bitmask | | | | | | | | Meaning |
|---|---|---|---|---|---|---|---|---|
| b7 | b6 | b5 | b4 | b3 | b2 | b1 | b0 | |
| 0 | 0 | 0 | 0 | 0 | 0 | | | RFU |
| ... | | | | | | | | ... |
| | | | | | | X | | 0b: The NFCC is not allowed to determine the at least one to-be-used RF technology in the RF technology supported by the first application 1b: The NFCC is allowed to determine the at least one to-be-used RF technology in the RF technology supported by the first application |

Table 10 is obtained after the reserved bit b1 is newly defined based on a table defined in the NCI specification in this embodiment of the present disclosure, and other content in the table is omitted. It can be learned that, when a value of b1 is 0b, the NFCC is allowed to determine the at least one to-be-used RF technology in the RF technology supported by the first application; or when a value of b1 is 1b, the NFCC is not allowed to determine the at least one to-be-used RF technology in the RF technology supported by the first application.

Alternatively, the instruction information may be implemented by extending a bit in a parameter CON_DISCOVERY_PARAM defined in the NCI specification. A format of the parameter CON_DISCOVERY_PARAM is shown in Table 11.

TABLE 11

| Bitmask | | | | | | | | |
|---|---|---|---|---|---|---|---|---|
| b7 | b6 | b5 | b4 | b3 | b2 | b1 | b0 | Meaning |
| Octet 0 | | 0 | 0 | 0 | | | | RFU |
| | | | | | . . . . . . | | | . . . . . . |
| | | | | . . . | | | | . . . |
| | | | | | X | | | 0b: The NFCC is not allowed to determine the at least one to-be-used RF technology in the RF technology supported by the first application<br>1b: The NFCC is allowed to determine the at least one to-be-used RF technology in the RF technology supported by the first application |
| . . . . . . | | | | | | | | . . . |

S42. The NFCC determines at least one to-be-used RF technology in the RF technology supported by the first application.

When the first application supports only one RF technology, the NFCC determines, as a to-be-used RF technology, the unique RF technology supported by the first application. When the first application supports multiple RF technologies, the NFCC determines one or more to-be-used RF technologies in the multiple RF technologies supported by the first application, and the NFCC may determine, as to-be-used RF technologies, all the RF technologies supported by the first application.

The NFCC may implement S42 in multiple manners. For example, the NFCC sets a variable for each of the RF technologies supported by all the applications installed on the first device (it is assumed that all the applications installed on the first device support four RF technologies in total: NFC-A, NFC-B, NFC-F, and NFC-V). This is shown in Table 12.

TABLE 12

| Variable | Variable value |
|---|---|
| CON_LISTEN_A | 1b |
| CON_LISTEN_B | 1b |
| CON_LISTEN_F | 1b |
| CON_LISTEN_V | 1b |

An initial variable value of each RF technology is 1b, to indicate that the first device may respond for the four RF technologies NFC-A, NFC-B, NFC-F, and NFC-V in a subsequent RF discovery process. When the user selects the first application (it is assumed that the first application supports only the NFC-V technology), the NFCC may keep a variable value corresponding to the to-be-used RF technology in Table 9 unchanged, and change, to 0b, variable values corresponding to the other RF technologies, so as to determine the NFC-V technology as the to-be-used RF technology, so that the NFCC returns, in the subsequent RF discovery process, a response message only for a detection command corresponding to the RF technology whose variable value is 1b.

Alternatively, the NFCC may set a variable CON_LISTEN_TECH that occupies 1 byte (b7 to b0), where b0 indicates an NFC-A technology, b1 indicates an NFC-B technology, b2 indicates an NFC-F technology, b3 indicates an NFC-V technology, and each of b5 to b7 is set to 0. In this case, before step S42, a value of the variable is 0Fh. After the user selects the first application (it is assumed that the first application supports only the NFC-V technology), the value of the variable is updated to 04h, so as to determine the NFC-V technology as the to-be-used RF technology.

Alternatively, the NFCC may set a variable value for an RF protocol supported by each RF technology, for example, set, to 1b, the variable value of the RF protocol supported by each RF technology. After the user selects the first application (it is assumed that the first application supports only the NFC-V technology), the NFCC keeps a variable value of an RF protocol corresponding to the NFC-V technology unchanged, and changes, to 0b, variable values of RF protocols corresponding to the other RF technologies, so as to determine the NFC-V technology as the to-be-used RF technology. S43. The NFCC receives a detection command sent by a second device for a first RF technology.

Each RF technology is corresponding to a detection command. In this embodiment in the present disclosure, the second device sends the detection command for the first RF technology. The first RF technology may be any RF technology (which includes but is not limited to the NFC-A, NFC-B, NFC-F, and NFC-V technologies). In actual application, the second device may support multiple RF technologies, or may be configured to send detection commands for multiple RF technologies. Alternatively, the second device may support only the first RF technology, or may be configured to send the detection command only for the first RF technology. This is not limited in this embodiment in the present disclosure.

In this embodiment in the present disclosure, the detection command includes but is not limited to the following commands defined in a related protocol (such as the Digital Protocol) of the NFC Forum: ALL_REQ or SENS_REQ for the NFC-A technology, ALLB_REQ or SENSE_REQ for the NFC-B technology, SENSF_REQ for the NFC-F technology, and INVENTORY_REQ for the NFC-V technology.

S44. The NFCC responds, according to the to-be-used RF technology, to the detection command sent by the second device.

When the to-be-used RF technology includes the first RF technology, the NFCC sends a response message for the detection command to the second device. When the to-beused RF technology does not include the first RF technology, the NFCC determines not to send a response message for the detection command.

In this embodiment of the present disclosure, the response message returned for the detection command includes but is not limited to the following responses defined in a related protocol (such as the Digital Protocol) in the NFC Forum: SENS_RES for the NFC-A technology, SENSB_RES for the NFC-B technology, SENSF_RES for the NFC-F technology, and INVENTORY_RES for the NFC-V technology.

By using the radio frequency discovery method provided in this embodiment of the present disclosure, after the user selects an application on the first device, the NFCC obtains an RF technology supported by the application, determines a to-be-used RF technology according to the RF technology supported by the application, then responds to only a detection command of the second device for the to-be-used RF technology, and keeps silent on (that is, does not respond to) a detection command of the second device for a non-to-be-used RF technology, so as to improve a probability that the application selected by the user on the first device is successfully selected by the peer second device. Therefore, a radio frequency discovery progress is accelerated, radio frequency discovery efficiency is improved, and resource overheads are reduced.

In this embodiment of the present disclosure, after performing radio frequency discovery according to the to-be-used RF technology for the first time, the NFCC may keep all or some of the to-be-used RF technology as a to-be-used RF technology within a preset time.

It is considered that the user may select a same application within a short time for multiple times to perform near field communication. Therefore, after performing radio frequency discovery according to the to-be-used RF technology for the first time, the NFCC may keep the to-be-used RF technology for the preset time, that is, within the preset time, perform radio frequency discovery by keeping using the to-be-used RF technology. In this case, the DH may not send the first instruction message to the NFCC within the preset time, or the NFCC may not determine the instruction information or not send the second request message to the DH, to further reduce the resource overheads.

Optionally, multiple applications are installed on the first device in this embodiment of the present disclosure. The multiple applications include N activated applications. Each application supports at least one RF technology. All the applications support M RF technologies in total. The NFCC determines L to-be-used RF technologies in K RF technologies supported by the first application, where N, M, K, and L are all positive integers, N≥2, M≥2, K<M, and L≥1. At least two of the N activated applications support different RF technologies.

It should be noted that, after learning that the user selects the first application, the DH usually may learn, in any one of the described manners, of the RF technology supported by the first application. In addition, the DH may learn of an RF technology not supported by the first application. For example, after finding, from the application information stored in the DH, the RF technology supported by the first application (for example, the NFC-A technology), the DH performs exclusion in all RF technologies supported by all current activated applications (for example, the NFC-A technology, the NFC-B technology, and the NFC-F technology), so as to find the RF technology not supported by the first application (for example, the NFC-B technology and the NFC-F technology). Alternatively, the DH may directly find, from the application information stored in the DH, the RF technology not supported by the first application. For another example, the DH may directly learn, from the NFCEE in which the first application is located, of the RF technology not supported by the first application. Certainly, the DH may learn, by means of active notification from the NFCEE, of the RF technology not supported by the first application, or may learn, by actively requesting the NFCEE, of the RF technology not supported by the first application. Certainly, alternatively, the DH may learn of both the RF technology supported by the first application and the RF technology not supported by the first application.

Figure 5:
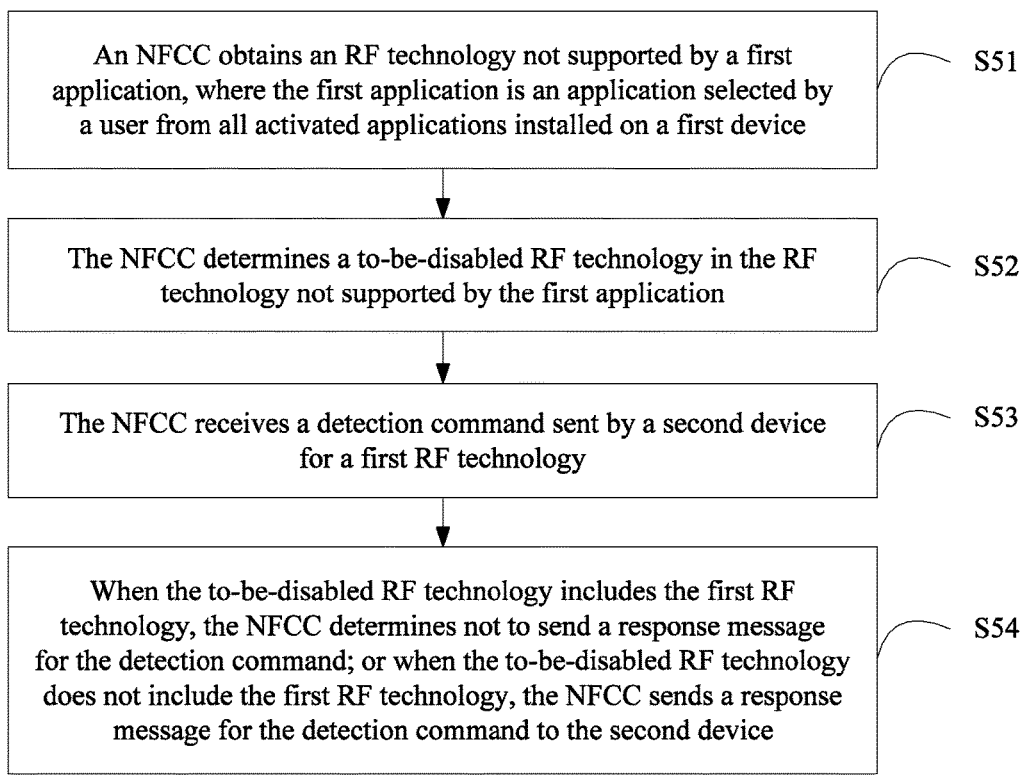
FIG. 5 is a flowchart of another RF discovery method according to an embodiment of the present disclosure.

In this embodiment of the present disclosure, alternatively, as shown in FIG. 5, after obtaining information indicating the RF technology supported by the first application, the NFCC may determine a to-be-disabled RF technology according to the RF technology supported by the first application, that is, a complementary set of a set of to-be-used RF technologies (for example, it is assumed that the first application supports only an NFC-V technology; and the NFCC determines, according to the RF technology supported by the first application, that to-be-disabled RF technologies are NFC-A, NFC-B, and NFC-F technologies). Then, after receiving a detection command sent by the second device for the first RF technology, when the to-be-disabled RF technology does not include the first RF technology, the NFCC sends a response message for the detection command to the second device; or when the to-be-disabled RF technology includes the first RF technology, the NFCC determines not to send a response message for the detection command. Correspondingly, the to-be-used RF technology carried in each message or command in this embodiment is replaced by the to-be-disabled RF technology. Further, the NFCC may directly obtain an RF technology not supported by the first application, and determine the to-be-disabled RF technology according to the RF technology not supported by the first application. Certainly, alternatively, after obtaining the RF technology not supported by the first application, the NFCC may determine the to-be-disabled RF technology according to the RF technology not supported by the first application. For a manner in which the NFCC obtains the RF technology not supported by the first application, refer to the foregoing description.

In this embodiment of the present disclosure, description is provided by using the four RF technologies NFC-A, NFC-B, NFC-F, and NFC-V as an example. However, this embodiment of the present disclosure is not limited thereto. Another RF technology is also applicable to this embodiment of the present disclosure. Each of the first device and the second device in this embodiment of the present disclosure is an NFC device.

An RF discovery method is described in Embodiment 1. In the following, Embodiment 2 describes an NFC chip that can implement the RF discovery method shown in FIG. 4.

Figure 6:
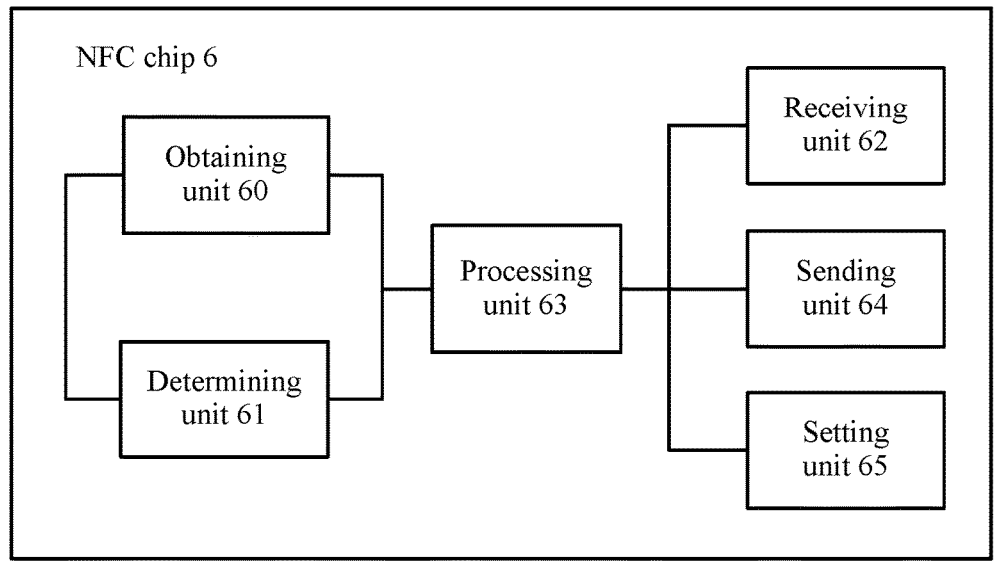
FIG. 6 is a schematic structural diagram of an NFC chip according to an embodiment of the present disclosure.

FIG. 6 is a schematic structural diagram of an NFC chip according to Embodiment 2 of the present disclosure. The NFC chip is disposed in a first device. At least two applications are installed on the first device. As shown in the figure, the NFC chip 6 includes:

an obtaining unit 60, configured to obtain an RF technology supported by a first application, where the first application is an application selected by a user from the at least two applications;

a determining unit 61, configured to determine at least one to-be-used RF technology in the RF technology supported by the first application;

a receiving unit 62, configured to receive a detection command sent by a second device for a first RF technology;

a processing unit 63, configured to: when the to-be-used RF technology includes the first RF technology, instruct a sending unit 64 to send a response message for the detection command to the second device; or when the to-be-used RF technology does not include the first RF technology, determine not to send a response message for the detection command; and the sending unit 64, configured to send the response message for the detection command to the second device.

The receiving unit 62 may be further configured to receive a first instruction message sent by a main controller DH. The first instruction message carries information indicating the RF technology supported by the first application. The first instruction message is used to instruct the NFC chip to determine the at least one to-be-used RF technology in the RF technology supported by the first application. In this case, the obtaining unit 60 may obtain, by using the first instruction message, the RF technology supported by the first application. Optionally, the receiving unit 62 includes two mutually independent receiving subunits. A first receiving subunit is configured to receive the detection command sent by the second device for the first RF technology. A second receiving subunit is configured to receive the first instruction message sent by the DH.

The sending unit 64 may be further configured to send a first request message to the DH before the receiving unit 62 receives the first instruction message sent by the DH. The first request message carries an identifier of the first application. The first request message is used to request the DH to query, according to the identifier of the first application, information indicating the RF technology supported by the first application. Optionally, the sending unit 64 includes two mutually independent sending subunits. A first sending subunit is configured to send the response message for the detection command to the second device. A second sending subunit is configured to send the first request message to the DH.

The obtaining unit 60 may further obtain, from a near field communication execution environment NFCEE in which the first application is located, information indicating the RF technology supported by the first application. In this case, the sending unit 64 may be further configured to send a second request message to a DH. The second request message carries at least one of the following: an identifier of the NFCEE in which the first application is located, an identifier of the first application, or information indicating the RF technology supported by the first application. The receiving unit 62 may be further configured to receive a second instruction message sent by the DH. The second instruction message is used to instruct the NFC chip to determine the at least one to-be-used RF technology in the RF technology supported by the first application. Optionally, the second sending subunit is configured to send the second request message to the DH, and the second receiving subunit is configured to receive the second instruction message sent by the DH.

Optionally, before the determining unit 61 determines the at least one to-be-used RF technology in the RF technology supported by the first application, the determining unit 61 is further configured to determine whether instruction information allows the NFC chip to determine the at least one to-be-used RF technology in the RF technology supported by the first application. The instruction information is a parameter preconfigured in the NFC chip. The instruction information indicates whether the NFC chip is allowed to determine the at least one to-be-used RF technology in the RF technology supported by the first application.

Optionally, the NFC chip further includes: a setting unit 65, configured to set all or some of the to-be-used RF technology to a to-be-used RF technology within a preset time.

It should be understood that the NFC chip 6 in this embodiment of the present disclosure may implement the RF discovery method shown in FIG. 4, and various examples of descriptions and optional solutions of the RF discovery method in Embodiment 1 are all applicable to Embodiment 2.

By using the NFC chip provided in this embodiment of the present disclosure, after the user selects an application on the first device, the NFC chip obtains an RF technology supported by the application, determines a to-be-used RF technology according to the RF technology supported by the application, then responds to only a detection command of the second device for the to-be-used RF technology, and keeps silent on (that is, does not respond to) a detection command of the second device for a non-to-be-used RF technology, so as to improve a probability that the application selected by the user on the first device is successfully selected by the peer second device. Therefore, a radio frequency discovery progress is accelerated, radio frequency discovery efficiency is improved, and resource overheads are reduced.

Alternatively, the NFC chip shown in FIG. 6 in this embodiment of the present disclosure may implement the RF discovery method shown in FIG. 5, and includes:

an obtaining unit 60, configured to obtain an RF technology supported or not supported by a first application, where the first application is an application selected by a user from the at least two applications;

a determining unit 61, configured to: determine at least one to-be-disabled RF technology according to the RF technology supported by the first application, or determine at least one to-be-disabled RF technology in the RF technology not supported by the first application;

a receiving unit 62, configured to receive a detection command sent by a second device for a first RF technology;

a processing unit 63, configured to: when the to-be-disabled RF technology includes the first RF technology, determine not to send a response message for the detection command; or when the to-be-disabled RF technology does not include the first RF technology, instruct a sending unit 64 to send a response message for the detection command to the second device; and the sending unit 64, configured to send the response message for the detection command to the second device.

The receiving unit 62 may be further configured to receive a first instruction message sent by a main controller DH. The first instruction message carries information indicating the RF technology supported or not supported by the first application. The first instruction message is used to instruct the NFC chip to determine the at least one to-be-disabled RF technology according to the RF technology supported by the first application, or is used to instruct the NFC chip to determine the at least one to-be-disabled RF technology in the RF technology not supported by the first application. In this case, the obtaining unit 60 may obtain, by using the first instruction message, information indicating the RF technology supported or not supported by the first application. Optionally, the receiving unit 62 includes two mutually independent receiving subunits. A first receiving subunit is configured to receive the detection command sent by the second device for the first RF technology. A second receiving subunit is configured to receive the first instruction message sent by the DH.

The sending unit 64 may further send a first request message to the DH before the receiving unit receives the first instruction message sent by the DH. The first request message carries an identifier of the first application. The first request message is used to request the DH to query, according to the identifier of the first application, information indicating the RF technology supported or not supported by the first application. Optionally, the sending unit 64 includes two mutually independent sending subunits. A first sending subunit is configured to send the response message for the detection command to the second device. A second sending subunit is configured to send the first request message to the DH.

The obtaining unit 60 may further obtain, from a near field communication execution environment NFCEE in which the first application is located, information indicating the RF technology supported or not supported by the first application. After the obtaining unit 60 obtains information indicating the RF technology supported or not supported by the first application, the sending unit 64 sends a second request message to a DH, where the second request message carries at least one of the following: an identifier of the NFCEE in which the first application is located, an identifier of the first application, or information indicating the RF technology supported or not supported by the first application; and the receiving unit 62 receives a second instruction message sent by the DH, where the second instruction message is used to instruct the NFC chip to determine the at least one to-be-disabled RF technology according to the RF technology supported by the first application, or the second instruction message is used to instruct the NFC chip to determine the at least one to-be-disabled RF technology in the RF technology not supported by the first application. Optionally, the second sending subunit is configured to send the second request message to the DH, and the second receiving subunit is configured to receive the second instruction message sent by the DH.

Optionally, before the determining unit 61 determines the at least one to-be-disabled RF technology according to the RF technology supported by the first application, or the NFC chip determines the at least one to-be-disabled RF technology in the RF technology not supported by the first application, the determining unit 61 first determines whether instruction information allows the NFC chip to determine the at least one to-be-disabled RF technology according to the RF technology supported by the first application, or the determining unit 61 first determines whether instruction information allows the NFC chip to determine the at least one to-be-disabled RF technology in the RF technology not supported by the first application. The instruction information is a parameter preconfigured in the NFC chip. The instruction information indicates whether the NFC chip is allowed to determine the at least one to-be-disabled RF technology according to the RF technology supported by the first application, or the instruction information indicates whether the NFC chip is allowed to determine the at least one to-be-disabled RF technology in the RF technology not supported by the first application.

Optionally, the NFC chip further includes: a setting unit 65, configured to set all or some of the to-be-disabled RF technology to a to-be-disabled RF technology within a preset time.

It should be understood that the NFC chip 6 in this embodiment of the present disclosure may implement the RF discovery method shown in FIG. 5, and various examples of descriptions and optional solutions of the RF discovery method in Embodiment 1 are all applicable to Embodiment 2.

By using the NFC chip provided in this embodiment of the present disclosure, after the user selects an application on the first device, the NFC chip obtains an RF technology supported or not supported by the application, determines a to-be-disabled RF technology according to the RF technology supported by the application or determines a to-be-disabled RF technology in the RF technology not supported by the application, then responds to only a detection command of the second device for a non-to-be-disabled RF technology, and keeps silent on (that is, does not respond to) a detection command of the second device for the to-be-disabled RF technology, so as to improve a probability that the application selected by the user on the first device is successfully selected by the peer second device. Therefore, a radio frequency discovery progress is accelerated, radio frequency discovery efficiency is improved, and resource overheads are reduced.

Figure 7:
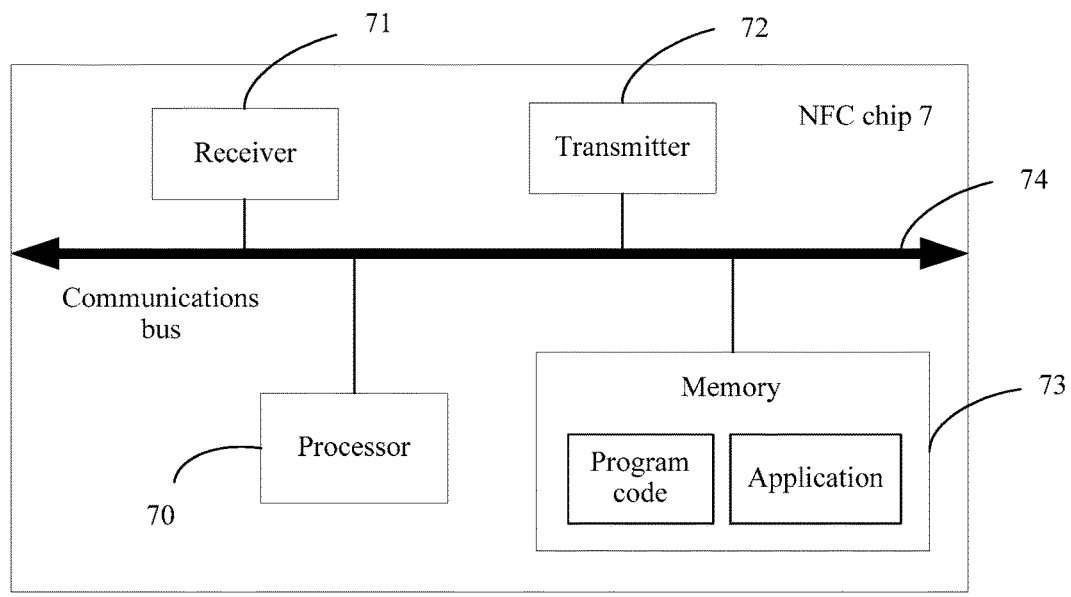
FIG. 7 is a schematic structural diagram of another NFC chip according to an embodiment of the present disclosure.

In the following, Embodiment 3 describes another NFC chip that can implement the RF discovery method shown in FIG. 4. FIG. 7 is a schematic structural diagram of another NFC chip according to Embodiment 3 of the present disclosure. The NFC chip is disposed in a first device. At least two applications are installed on the first device. As shown in the figure, the NFC chip 7 includes:

a processor 70, configured to:

obtain an RF technology supported by a first application, where the first application is an application selected by a user from the at least two applications;

determine at least one to-be-used RF technology in the RF technology supported by the first application;

instruct a receiver 71 to receive a detection command sent by a second device for a first RF technology; and when the to-be-used RF technology includes the first RF technology, instruct a transmitter 72 to send a response message for the detection command to the second device; or when the to-be-used RF technology does not include the first RF technology, determine not to send a response message for the detection command;

the receiver 71, configured to receive the detection command sent by the second device for the first RF technology;

the transmitter 72, configured to send the response message for the detection command to the second device;

a memory 73, configured to store program code; and a communications bus 74, configured to connect the receiver 71, the transmitter 72, the processor 70, and the memory 73.

The receiver 71 may be further configured to receive a first instruction message sent by a main controller DH. The first instruction message carries information indicating the RF technology supported by the first application. The first instruction message is used to instruct the NFC chip to determine the at least one to-be-used RF technology in the RF technology supported supported by the first application. The processor 70 may obtain, by using the first instruction message, information indicating the RF technology supported by the first application. Optionally, the receiver 71 includes two mutually independent sub receivers. A first sub receiver is configured to receive the detection command sent by the second device for the first RF technology. A second sub receiver is configured to receive the first instruction message sent by the DH.

The transmitter 72 may be further configured to send a first request message to the DH before the receiver 71 receives the first instruction message sent by the DH. The first request message carries an identifier of the first application. The first request message is used to request the DH to query, according to the identifier of the first application, information indicating the RF technology supported by the first application. Optionally, the transmitter 72 includes two mutually independent sub transmitters. A first sub transmitter is configured to send the response message for the detection command to the second device. A second sub transmitter is configured to send the first request message to the DH.

The memory 73 may be further configured to store the first application, and the processor 70 may further obtain, from the memory, information indicating the RF technology supported by the first application. After the processor 70 obtains information indicating the RF technology supported by the first application, the transmitter 72 may be further configured to send a second request message to a DH, where the second request message carries at least one of the following: an identifier of the memory 73, an identifier of the first application, or information indicating the RF technology supported by the first application; and the receiver 71 may be further configured to receive a second instruction message sent by the DH, where the second instruction message is used to instruct the NFC chip to determine the at least one to-be-used RF technology in the RF technology supported by the first application. Optionally, the second sub transmitter is configured to send the second request message to the DH, and the second sub receiver is configured to receive the second instruction message sent by the DH.

Optionally, before the processor 70 determines the at least one to-be-used RF technology in the RF technology supported by the first application, the processor 70 is further configured to determine whether instruction information allows the NFC chip to determine the at least one to-be-used RF technology in the RF technology supported by the first application. The instruction information is a parameter preconfigured in the NFC chip. The instruction information indicates whether the NFC chip is allowed to determine the at least one to-be-used RF technology in the RF technology supported by the first application.

Optionally, the processor 70 is further configured to set all or some of the to-be-used RF technology to a to-be-used RF technology within a preset time.

It should be understood that the NFC chip 7 in this embodiment of the present disclosure may implement the RF discovery method shown in FIG. 4, and various examples of descriptions and optional solutions of the RF discovery method in Embodiment 1 are all applicable to Embodiment 3.

By using the NFC chip provided in this embodiment of the present disclosure, after the user selects an application on the first device, the NFC chip obtains an RF technology supported by the application, determines a to-be-used RF technology according to the RF technology supported by the application, then responds to only a detection command of the second device for the to-be-used RF technology, and keeps silent on (that is, does not respond to) a detection command of the second device for a non-to-be-used RF technology, so as to improve a probability that the application selected by the user on the first device is successfully selected by the peer second device. Therefore, a radio frequency discovery progress is accelerated, radio frequency discovery efficiency is improved, and resource overheads are reduced.

Alternatively, the NFC chip shown in FIG. 7 in this embodiment of the present disclosure may implement the RF discovery method shown in FIG. 5, and includes:

a processor 70, configured to:
obtain an RF technology supported or not supported by a first application, where the first application is an application selected by a user from the at least two applications;
determine at least one to-be-disabled RF technology according to the RF technology supported by the first application, or determine at least one to-be-disabled RF technology in the RF technology not supported by the first application;
instruct a receiver 71 to receive a detection command sent by a second device for a first RF technology; and
when the to-be-disabled RF technology includes the first RF technology, determine not to send a response message for the detection command; or when the to-be-disabled RF technology does not include the first RF technology, instruct a transmitter 72 to send a response message for the detection command to the second device;
the receiver 71, configured to receive the detection command sent by the second device for the first RF technology;
the transmitter 72, configured to send the response message for the detection command to the second device;
a memory 73, configured to store program code; and
a communications bus 74, configured to connect the receiver 71, the transmitter 72, the processor 70, and the memory 73.

The receiver 71 may be further configured to receive a first instruction message sent by a main controller DH. The first instruction message carries information indicating the RF technology supported or not supported by the first application. The first instruction message is used to instruct the NFC chip to determine the at least one to-be-disabled RF technology according to information indicating the RF technology supported by the first application, or the first instruction message is used to instruct the NFC chip to determine the at least one to-be-disabled RF technology in the RF technology not supported by the first application. The processor 70 may obtain, by using the first instruction message, information indicating the RF technology supported or not supported by the first application. Optionally, the receiver 71 includes two mutually independent sub receivers. A first sub receiver is configured to receive the detection command sent by the second device for the first RF technology. A second sub receiver is configured to receive the first instruction message sent by the DH.

The transmitter 72 may further send a first request message to the DH before the receiver receives the first instruction message sent by the DH. The first request message carries an identifier of the first application. The first request message is used to request the DH to query, according to the identifier of the first application, information indicating the RF technology supported or not supported by the first application. Optionally, the transmitter 72 includes two mutually independent sub transmitters. A first sub transmitter is configured to send the response message for the detection command to the second device. A second sub transmitter is configured to send the first request message to the DH.

The memory may be further configured to store the first application, and the processor 70 may obtain, from the memory, information indicating the RF technology supported or not supported by the first application. After the processor 70 obtains information indicating the RF technology supported or not supported by the first application, the transmitter 72 may be further configured to send a second request message to a DH, where the second request message carries at least one of the following: an identifier of the memory, an identifier of the first application, or information indicating the RF technology supported or not supported by the first application; and the receiver 71 may be further configured to receive a second instruction message sent by the DH, where the second instruction message is used to instruct the NFC chip to determine the at least one to-be-disabled RF technology according to the RF technology supported by the first application, or the second instruction message is used to instruct the NFC chip to determine the at least one to-be-disabled RF technology in the RF technology not supported by the first application. Optionally, the second sub transmitter is configured to send the second request message to the DH, and the second sub receiver is configured to receive the second instruction message sent by the DH.

Optionally, before the processor 70 determines the at least one to-be-disabled RF technology according to the RF technology supported by the first application, or the NFC chip determines the at least one to-be-disabled RF technology in the RF technology not supported by the first application, the processor 70 is further configured to determine whether instruction information allows the NFC chip to determine the at least one to-be-disabled RF technology according to the RF technology supported by the first application, or the processor 70 is further configured to determine whether instruction information allows the NFC chip to determine the at least one to-be-disabled RF technology in the RF technology not supported by the first application. The instruction information is a parameter preconfigured in the NFC chip. The instruction information indicates whether the NFC chip is allowed to determine the at least one to-be-disabled RF technology according to the RF technology supported by the first application, or the instruction information indicates whether the NFC chip is allowed to determine the at least one to-be-disabled RF technology in the RF technology not supported by the first application.

Optionally, the processor 70 further configured to set all or some of the to-be-disabled RF technology to a to-be-disabled RF technology within a preset time.

It should be understood that the NFC chip 7 in this embodiment of the present disclosure may implement the RF discovery method shown in FIG. 5, and various examples of descriptions and optional solutions of the RF discovery method in Embodiment 1 are all applicable to Embodiment 3.

By using the NFC chip provided in this embodiment of the present disclosure, after the user selects an application on the first device, the NFC chip obtains an RF technology supported or not supported by the application, determines a to-be-disabled RF technology according to the RF technology supported by the application or determines a to-be-disabled RF technology in the RF technology not supported by the application, then responds to only a detection command of the second device for a non-to-be-disabled RF technology, and keeps silent on (that is, does not respond to) a detection command of the second device for the to-be-disabled RF technology, so as to improve a probability that the application selected by the user on the first device is successfully selected by the peer second device. Therefore, a radio frequency discovery progress is accelerated, radio frequency discovery efficiency is improved, and resource overheads are reduced.

The NFC chip in this embodiment of the present disclosure includes the NFC chip provided in Embodiment 2 and Embodiment 3, and may be disposed in any type of NFC device. An NFC device in which the NFC chip 6 and the NFC chip 7 are disposed may also implement the foregoing technical effect.

It should be understood that in the foregoing embodiments described in the present disclosure, the processor may be a central processing unit (Central Processing Unit, CPU), or may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any suitable processor, or the like.

The memory may include a read-only memory and a random access memory, store program code, and provide an instruction and data for the processor.

The communications bus may include a power bus, a control bus, a status signal bus, and the like, in addition to a data bus. However, for clear description, various types of buses in the figure are marked as the communications bus.

In an implementation process, steps in the foregoing methods can be implemented by using a hardware integrated logical circuit in the processor, or by using instructions in a form of software. The steps of the method disclosed with reference to the embodiments described in the present disclosure may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with hardware of the processor. To avoid repetition, details are not described herein.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments described in the present disclosure.

In addition, functional units in the embodiments described in the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments described in the present disclosure. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A radio frequency (RF) discovery method, wherein the method is applied to a near field communication controller (NFCC) in a first device, at least two applications are installed on the first device, and the radio frequency discovery method comprises:
   obtaining, by the NFCC, information indicating an RF technology supported by a first application, wherein the first application is an application selected by a user from the at least two applications;
   determining, by the NFCC, at least one to-be-used RF technology in the RF technology supported by the first application;
   receiving, by the NFCC, a detection command sent by a second device for a first RF technology; and
   sending, by the NFCC, a response message for the detection command to the second device when the to-be-used RF technology comprises the first RF technology; or determining, by the NFCC, not to send a response message for the detection command when the to-be-used RF technology does not comprise the first RF technology.

2. The method according to claim 1, wherein the obtaining, by the NFCC, the information indicating an RF technology supported by a first application comprises:
   receiving, by the NFCC, a first instruction message sent by a device host (DH), wherein the first instruction message carries the RF technology supported by the first application, and the first instruction message is used to instruct the NFCC to determine the at least one to-be-used RF technology in the RF technology supported by the first application; and
   obtaining, by the NFCC by using the first instruction message, the RF technology supported by the first application.

3. The method according to claim 2, wherein before the receiving, by the NFCC, a first instruction message sent by a DH, the radio frequency discovery method further comprises:
   sending, by the NFCC, a first request message to the DH, wherein the first request message carries an identifier of the first application, and the first request message is used to request the DH to query, according to the identifier of the first application, the RF technology supported by the first application.

4. The method according to claim 1, wherein the obtaining, by the NFCC, the information indicating an RF technology supported by a first application comprises:
   obtaining, by the NFCC from a near field communication execution environment (NFCEE) in which the first application is located, the RF technology supported by the first application.

5. The method according to claim 4, wherein after the obtaining, by the NFCC, an RF technology supported by a first application, the radio frequency discovery method further comprises:
   sending, by the NFCC, a second request message to a DH, wherein the second request message carries at least one of the following: an identifier of the NFCEE in which the first application is located, an identifier of the first application, or the RF technology supported by the first application; and
   receiving, by the NFCC, a second instruction message sent by the DH, wherein the second instruction message is used to instruct the NFCC to determine the at least one to-be-used RF technology in the RF technology supported by the first application.

6. The method according to claim 1, wherein before the determining, by the NFCC, at least one to-be-used RF technology in the RF technology supported by the first application, the radio frequency discovery method further comprises:
   determining, by the NFCC, whether instruction information allows the NFCC to determine the at least one to-be-used RF technology in the RF technology supported by the first application, wherein the instruction information is a parameter preconfigured in the NFCC, and the instruction information indicates whether the NFCC is allowed to determine the at least one to-be-used RF technology in the RF technology supported by the first application.

7. The method according to claim 1, wherein the radio frequency discovery method further comprises:
   setting, by the NFCC, all or some of the to-be-used RF technology to a to-be-used RF technology within a preset time.

8. An NFC chip, wherein the NFC chip is disposed in a first device, at least two applications are installed on the first device, and the NFC chip comprises:
   a processor, configured to:
   obtain information indicating an RF technology supported by a first application, wherein the first application is an application selected by a user from the at least two applications;
   determine at least one to-be-used RF technology in the RF technology supported by the first application;

instruct a receiver to receive a detection command sent by a second device for a first RF technology; and instruct a transmitter to send a response message for the detection command to the second device when the to-be-used RF technology comprises the first RF technology; or determine not to send a response message for the detection command when the to-be-used RF technology does not comprise the first RF technology;

the receiver, configured to receive the detection command sent by the second device for the first RF technology;

the transmitter, configured to send the response message for the detection command to the second device;

a memory, configured to store program code; and a communications bus, configured to connect the receiver, the transmitter, the processor, and the memory.

9. The NFC chip according to claim 8, wherein the receiver is further configured to receive a first instruction message sent by a device host (DH), wherein the first instruction message carries the information indicating the RF technology supported by the first application, and the first instruction message is used to instruct the NFC chip to determine the at least one to-be-used RF technology in the RF technology supported by the first application; and that the processor is configured to obtain the RF technology supported by the first application comprises:

the processor is configured to obtain, by using the first instruction message, the RF technology supported by the first application.

10. The NFC chip according to claim 9, wherein before the receiver receives the first instruction message sent by the DH, the transmitter is further configured to send a first request message to the DH, wherein the first request message carries an identifier of the first application, and the first request message is used to request the DH to query, according to the identifier of the first application, the RF technology supported by the first application.

11. The NFC chip according to claim 8, wherein the memory is further configured to store the first application, and that the processor is configured to obtain the RF technology supported by the first application comprises:

the processor is configured to obtain, from the memory, the RF technology supported by the first application.

12. The NFC chip according to claim 11, wherein after the processor obtains the RF technology supported by the first application, the transmitter is further configured to send a second request message to a DH, wherein the second request message carries at least one of the following: an identifier of the memory, an identifier of the first application, or the RF technology supported by the first application; and the receiver is further configured to receive a second instruction message sent by the DH, wherein the second instruction message is used to instruct the NFC chip to determine the at least one to-be-used RF technology in the RF technology supported by the first application.

13. The NFC chip according to claim 8, wherein before the processor determines the at least one to-be-used RF technology in the RF technology supported by the first application, the processor is further configured to determine whether instruction information allows the NFC chip to determine the at least one to-be-used RF technology in the RF technology supported by the first application, wherein the instruction information is a parameter preconfigured in the NFC chip, and the instruction information indicates whether the NFC chip is allowed to determine the at least one to-be-used RF technology in the RF technology supported by the first application.

14. The NFC chip according to claim 8, wherein the processor is further configured to set all or some of the to-be-used RF technology to a to-be-used RF technology within a preset time.

15. An NFC device, wherein the NFC device comprises a NFC chip according to claim 8.

* * * * *